United States Patent [19]

Harris et al.

[11] Patent Number: 5,056,570
[45] Date of Patent: Oct. 15, 1991

[54] CAPLESS VEHICLE REFUELING SYSTEM

[75] Inventors: Robert S. Harris; Jeffrey Griffin, both of Connersville, Ind.

[73] Assignee: Stant Inc., Connersville, Ind.

[21] Appl. No.: 498,612

[22] Filed: Mar. 26, 1990

[51] Int. Cl.$^5$ .................. B65B 31/00; B65B 1/04
[52] U.S. Cl. .................. 141/59; 220/85 VR; 141/302; 141/351
[58] Field of Search .................. 141/44, 45, 46, 59, 141/286, 301, 302, 312, 220, 346, 348, 349, 351, 352, 354; 137/587, 289; 55/387; 220/DIG. 33, 85 R, 86 R, 85 VR, 86 AT

[56] References Cited

U.S. PATENT DOCUMENTS

| 3,289,711 | 12/1966 | Hall . | |
|---|---|---|---|
| 3,477,611 | 11/1969 | Niles . | |
| 3,543,484 | 12/1970 | Davis . | |
| 3,643,690 | 2/1972 | Sarai | 137/587 |
| 3,748,829 | 7/1978 | Joyce et al. | 55/74 |
| 3,763,901 | 10/1973 | Viland | 141/8 |
| 3,884,204 | 5/1975 | Krautwurst et al. | 123/136 |
| 3,907,153 | 9/1975 | Mutty | 220/86 R |
| 3,911,977 | 10/1975 | Berger | 141/348 |
| 3,921,412 | 11/1975 | Heath et al. | 220/85 F |
| 3,938,564 | 2/1976 | Jones | 141/352 |
| 4,122,968 | 10/1978 | Germain | 220/86 R |
| 4,142,647 | 3/1979 | Walters | 220/85.8 |
| 4,232,715 | 11/1980 | Pyle | 141/1 |
| 4,312,649 | 1/1982 | Fujii et al. | 55/387 |
| 4,420,392 | 12/1983 | Harris | 210/86 |
| 4,424,839 | 1/1984 | Otani et al. | 141/348 |
| 4,441,533 | 4/1984 | Snyder | 141/59 |
| 4,630,749 | 12/1986 | Armstrong et al. | 220/86 R |
| 4,651,889 | 3/1987 | Uranishi et al. | 220/85 VR |
| 4,694,847 | 9/1987 | Szlaga | 137/39 |
| 4,699,638 | 10/1987 | Harris | 55/168 |
| 4,701,198 | 10/1987 | Uranishi et al. | 55/387 |
| 4,702,386 | 10/1987 | Boehmer et al. | 220/86 R |
| 4,714,172 | 12/1987 | Morris | 220/86 R |
| 4,722,454 | 2/1988 | Fisher | 220/85 R |
| 4,741,369 | 5/1988 | Dawson | 141/286 |
| 4,747,508 | 5/1988 | Sherwood | 220/86 R |
| 4,765,504 | 8/1988 | Sherwood et al. | 220/86 R |
| 4,770,677 | 9/1988 | Harris | 55/168 |
| 4,809,863 | 3/1989 | Woodcock et al. | 220/85 F |
| 4,816,045 | 3/1989 | Szlaga et al. | 55/168 |
| 4,826,511 | 5/1989 | Harris | 55/168 |
| 4,836,835 | 7/1989 | Harris et al. | 55/168 |
| 4,877,146 | 10/1989 | Harris | 220/85 VR |
| 4,883,103 | 11/1989 | Szlaga et al. | 141/368 |

Primary Examiner—Henry J. Recla
Assistant Examiner—David J. Walczak
Attorney, Agent, or Firm—Barnes & Thornburg

[57] ABSTRACT

An assembly is provided for controlling filling of a vehicle fuel tank having a filler neck. The assembly includes a capless fuel and fuel vapor handling system for controlling a filling operation of a fuel tank and the discharge of fuel vapors from the tank and filler neck both during and after the filling operation.

36 Claims, 5 Drawing Sheets

FIG. 1

CAPLESS VEHICLE REFUELING SYSTEM

BACKGROUND AND SUMMARY OF THE INVENTION

The present invention relates to an assembly for controlling filling of the vehicle fuel tank having a filler neck. More particularly, the present invention relates to a fuel and fuel vapor handling system which controls a filling operation of a fuel tank and which controls the discharge of fuel vapors from the tank and the filler neck both during and after the filling operation.

A fuel cap with a sealing gasket typically is used to close the open end of a fuel tank filler neck. Once the fuel tank is filled and the fuel-dispensing nozzle is withdrawn from the filler neck, the fuel cap is reattached to the filler neck so that the sealing gasket forms a seal between the fuel cap and the filler neck. Thus, the fuel cap closes the open end of the filler neck to block discharge of liquid fuel and fuel vapor from the fuel tank through the filler neck. It is known however to place pressure relief and vacuum relief valves in fuel caps to permit some controlled venting of fuel vapors in the filler neck while the fuel cap is mounted on the filler neck.

It has been observed that fuel caps are often lost or damaged over time and, as a result, the open end of the filler neck might not be closed and sealed in accordance with the original equipment specifications during operation of the vehicle. Accordingly, a filler neck configured to "open" automatically to receive a fuel-dispensing pump nozzle therein during refueling and "close" automatically once the attendant withdraws the pump nozzle from the filler neck without requiring the attendant to reattach a fuel cap to the filler neck would be an improvement over many conventional capped filler-neck systems. Although conventional fuel caps function to close filler necks in a satisfactory manner, it is thought that a capless filler neck could make vehicle refueling more convenient for the consumer because no action other than inserting a pump nozzle into the open end of the filler neck would be required to refuel a vehicle. Advantageously, such a capless filler-neck system would be configured in accordance with the present invention to include internal liquid fuel and fuel vapor control means.

One object of the present invention is to provide a refueling system which does not require use of a conventional fuel cap.

Another object of the present invention is to provide a capless refueling system which is capable of maintaining acceptable fuel tank fill rates without premature shutoff of the fuel nozzle.

Yet another object of the present invention is to provide a refueling system which controls handling fuel vapor in the system both during and after the fuel refilling process.

Still another object of the present invention is to provide a system for automatically venting the fuel tank during refueling in response to insertion of a fuel-dispensing pump nozzle into a fuel tank filler neck. In one embodiment of the invention, the fuel tank is vented to the atmosphere, while in another embodiment of the invention, the fuel tank is vented to a canister for processing fuel vapor in an onboard, fuel-vapor recovery system.

Another object of the present invention is to provide an internal drain system for discharging water or other contaminants that might inadvertently leak into the filler neck from the filler neck to the ground underneath the vehicle to minimize the opportunity for such contaminants to be carried into the fuel tank through the filler neck during refueling.

Yet another object of the invention is to provide a nozzle shutoff system for controlling the pressure in the region of the filler neck containing the pump nozzle during refueling to control triggering shutoff of fuel flow from a pressure-actuated pump nozzle once the fuel tank is filled to a predetermined maximum volume to control filling of the fuel tank in such a way as to prevent overfilling of the fuel tank.

Still another object of the invention is to provide a pressure and vacuum relief system in a fuel tank filler neck which will enable the fuel tank to vent whenever a predetermined high pressure or a predetermined negative pressure exists within the fuel tank even when the filler neck is otherwise closed by its internal pump nozzle-actuated, filler-neck closure system.

According to the present invention, an assembly is provided for controlling filling of a vehicle fuel tank having a filler neck. The assembly includes means for conducting liquid fuel through a fill passageway to the filler neck for delivery to the fuel tank. The conducting means is formed to include means for admitting a fuel-dispensing nozzle therein to introduce liquid fuel into the conducting means. The conducting means also includes valve means for normally closing the fill passageway. The valve means is movable between a fill passageway-opening and a fill passageway-closing position. The assembly also includes valve control means for moving the valve means from its fill passageway-closing position to the fill passageway-opening position in response to movement of a fuel-dispensing nozzle into the fill passageway. The valve control means is situated in the fill passageway to engage the fuel-dispensing nozzle inserted therein. The valve control means is connected to the valve means.

In preferred embodiments of the present invention, the conducting means includes partition means for dividing the fill passageway into an outer chamber communicable with the atmosphere and an inner chamber in fluid communication with the filler neck. The partition means is formed to include an aperture interconnecting the outer and inner chambers in fluid communication. The valve means includes the closure member situated in the inner chamber and configured to close the aperture to block the flow of fluid from the outer chamber to the inner chamber upon movement of the valve means to its fill passageway-closing position.

Also in preferred embodiments, the valve means includes first spring means for yieldably biasing the closure member into engagement with the partition means to close the aperture interconnecting the inner and outer chambers. The valve control means includes means for engaging a fuel-dispensing nozzle inserted into the outer chamber and means for moving the closure member against a biasing force provided by the first spring means. The moving means moves the closure member from its normal position closing the aperture to a retracted position opening the aperture in response to movement of the fuel-dispensing nozzle in the outer chamber against the engaging means.

In preferred embodiments, the valve means is a spring-loaded fill valve or closure member sized to close an aperture provided in the fill passageway and the valve control means is a nozzle-actuated slide member coupled to the closure member. In operation, the distal end of the pump nozzle engages the slide member and moves the slide member in the fill passageway enough to cause the closure member to move against its biasing spring from a normally closed position to an aperture-opening position so that fuel is able to flow through the aperture and the remaining portion of the filler neck and into the fuel tank.

Also, in preferred embodiments, a normally-open contaminant drain valve is provided for controlling drainage of liquids from the outer chamber of the fill passageway to lessen the chance that such liquids could pass through the aperture into the fuel tank upon movement of the closure member to its aperture-opening position during refueling. Also, a normally-closed nozzle shutoff valve is provided for controlling delivery of make-up vapor from the fuel tank to the outer chamber during refueling so that the magnitude of pressure in the outer chamber around the automatic shutoff sensor on the pump nozzle exceeds the magnitude of negative pressure needed to trigger that sensor and automatically shut off fuel delivery through the pump nozzle only when the volume of liquid fuel in the fuel tank is fully filled. Further, a normally-closed tank venting valve is provided for venting the fuel tank to the atmosphere. In the illustrative embodiment, the normally-open contaminant drain valve is closed, the normally-closed nozzle shutoff valve is opened, and the normally-closed tank venting valve is opened in response to movement of the slide member to open the normally closed fill valve or closure member during insertion of the pump nozzle into the filler neck to begin the refueling process.

Additional objects, feature, and advantages of the invention will become apparent to those skilled in the art upon consideration of the following detailed description of the preferred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
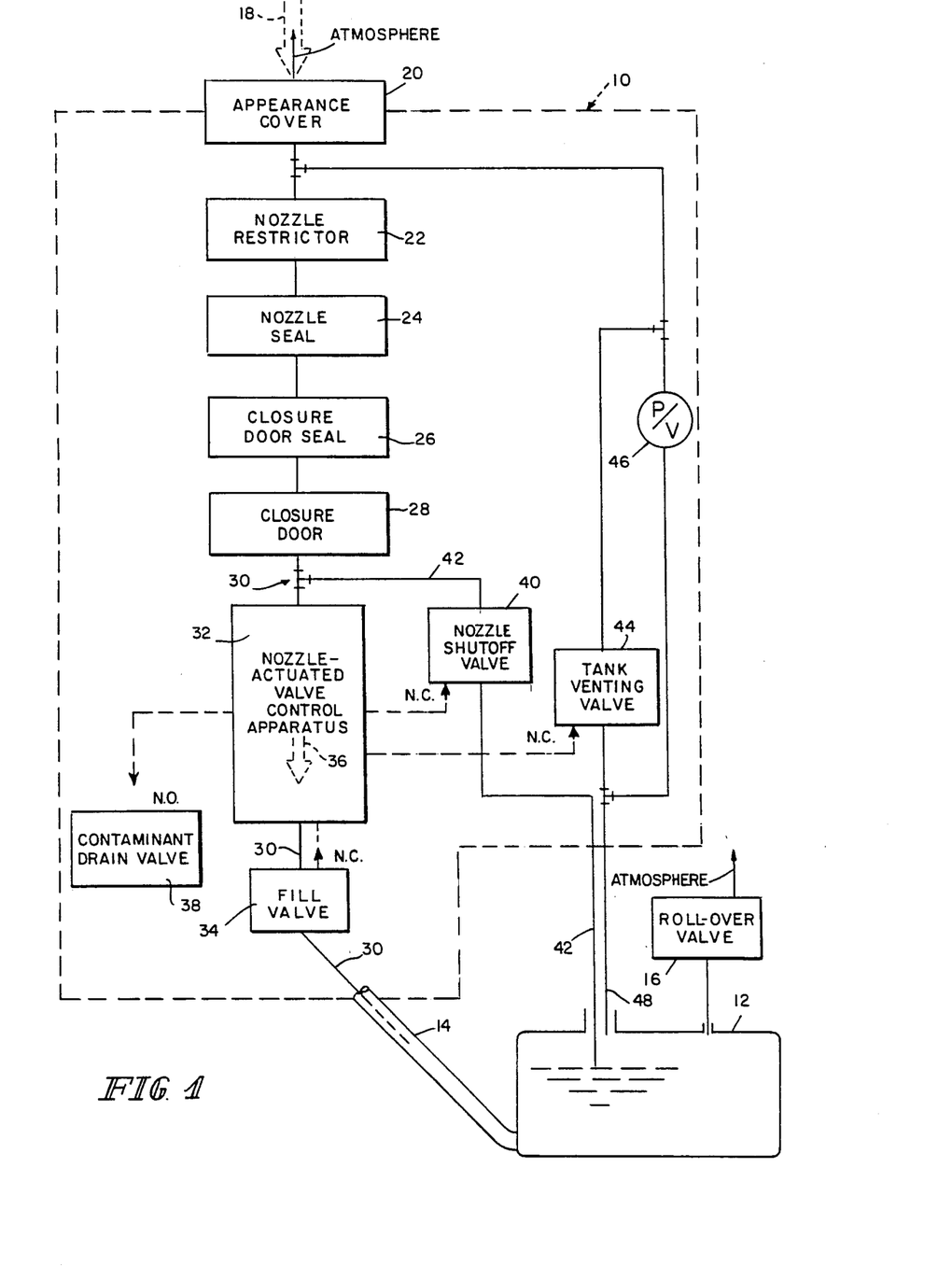
FIG. 1 is a block diagram schematically illustrating the vehicle fuel tank filling control system according to the present invention.

The filling control system 10 of the present invention is schematically illustrated in the block diagram shown in FIG. 1. The filling control system 10 provides an assembly for controlling the refueling of a vehicle fuel tank 12 having a filler neck 14. Fuel tank 12 can also include a suitable roll-over valve 16. The filling control system 10 eliminates the need for conventional fuel caps. In operation, a fuel nozzle (not shown in FIG. 1) is inserted into the filling control system 10 in the direction of arrow 18.

The filling control system 10 includes an appearance cover 20, a nozzle restrictor 22, a nozzle seal 24, a closure door seal 26, and a normally closed closure door 28 leading to a fill passageway 30. The fuel nozzle is inserted through the appearance cover 20 and through nozzle restrictor 22. Nozzle restrictor 22 permits only unleaded fuel nozzles to pass through the restrictor 22 into fill passageway 30. Nozzle seal 24 engages the outer periphery of the fuel nozzle to provide a seal. Closure door seal 26 provides a seal for closure door 28 when the closure door 28 is in its normally closed position during times other than refueling. Fuel nozzle moves closure door 28 from its normally closed position to an open position as it is inserted into the fill passageway 30.

The fuel nozzle then passes into a fluid fill passageway 30 and engages a nozzle-actuated valve control apparatus 32. Valve control apparatus 32 is connected to a fill valve 34 located in fill passageway 30. Fill valve 34 is a normally closed valve for closing or blocking the fill passageway 30 when the fuel nozzle is removed from the fill passageway 30. Fuel nozzle moves valve control apparatus 32 in the direction of arrow 36 to open fill valve 34. Fuel can then be dispensed through the open fill passageway 30 into filler neck 14 of fuel tank 12.

Figures 10, 11, 12:
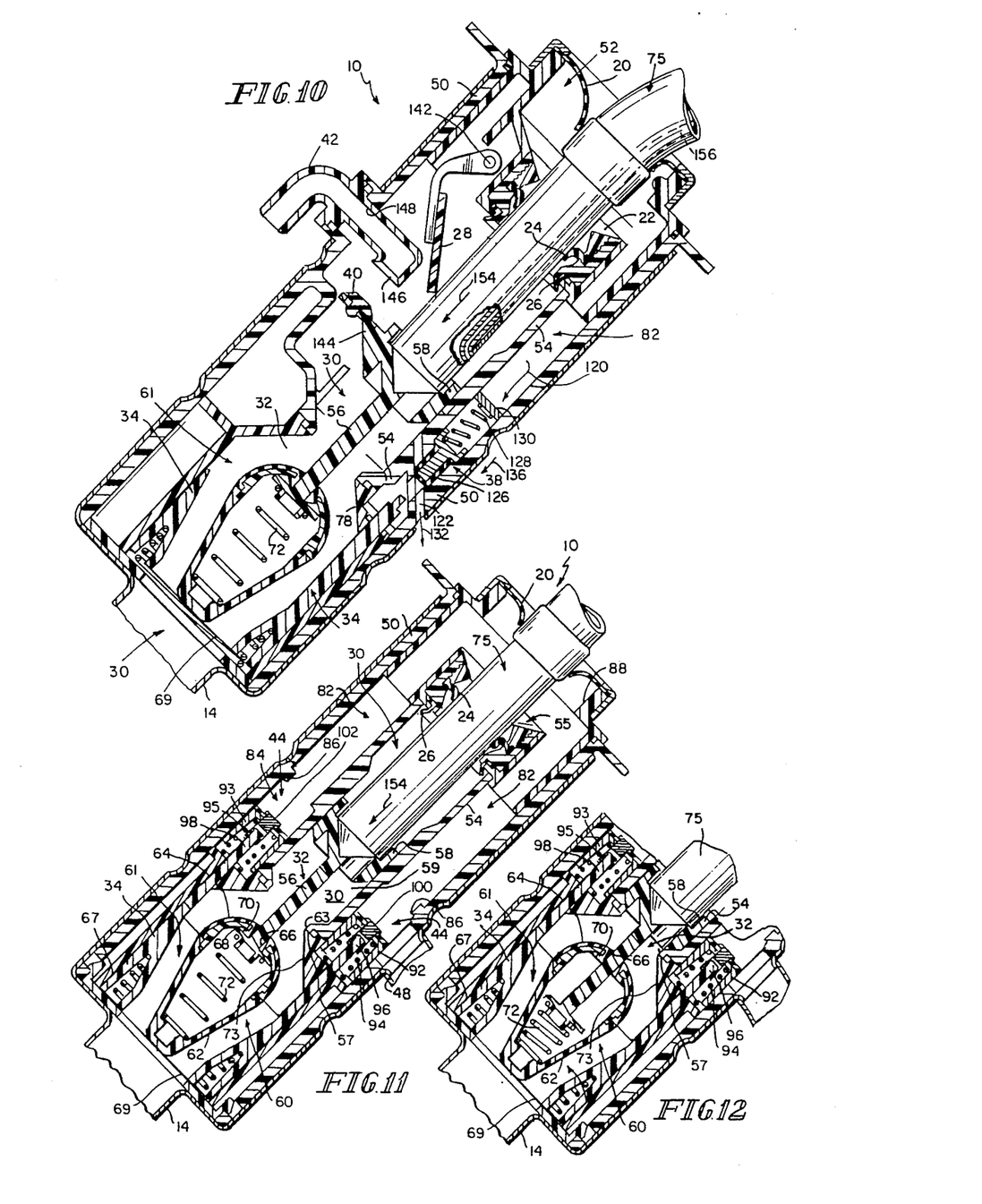
FIG. 10 is a transverse sectional view of the filling control system during refueling of the fuel tank illustrating a fuel nozzle inside the fill passageway to move the fill valve to its fill passageway-opening position, the nozzle shutoff valve in its open position, and the contaminant drain valve in its closed position.
FIG. 11 is a sectional view similar to FIG. 10 illustrating the two tank venting valves in their open position when the fill valve is in the fill passageway-opening position.
FIG. 12 is a sectional view similar to FIG. 11 illustrating operation of a fuel nozzle overtravel mechanism to accommodate a long pump nozzle.

After the fuel nozzle is removed from the fill passageway 30, water or other contaminants may enter the fill passageway 30 either inadvertently or as a result of user neglect or tampering. Therefore, a normally open contaminant drain valve 38 is provided to permit drainage of such contaminants from the fill passageway 30. Contaminant drain valve 38 remains in its normally open position when the fill valve 34 is in its normally closed position. When the fill valve 34 moves to its open position in response to actuation by valve control apparatus 32, drain contaminant valve 38 moves to a closed position to prevent fuel from escaping the fill passageway 30 through a drain aperture as best shown in FIG. 10.

The filling control system 10 further includes a normally closed nozzle shutoff valve 40. A nozzle shutoff tube 42 interconnects the fuel tank 12 with a vent housing of filling control system 10. Nozzle shutoff valve 40 is a normally closed valve used to seal an end of the nozzle shutoff tube 42 inside the vent housing at times other than during refueling. During refueling, valve control apparatus 32 moves nozzle shutoff valve 40 to an open position. Nozzle shutoff tube 42 provides make-up air to fill the interior region of the vent housing as fuel enters fuel tank 12. Once the level of fuel inside tank 12 rises above the end of nozzle shutoff tube 42 located inside fuel tank 12, a vacuum is created inside fill the interior region of vent housing which automatically shuts off the fuel nozzle. This feature is best shown in FIG. 10. Reference is hereby made to U.S. Pat. No. 4,816,045, which is incorporated herein by reference, for a detailed description of a suitable make-up vapor supply system for use in triggering automatic shutoff of a fuel-dispensing pump nozzle.

The filling control system 10 also includes a normally closed tank venting valve 44 and a pressure/vacuum valve 46. A tank venting tube 48 connects the fuel tank 12 with a chamber inside the vent housing. Tank venting valve 44 is a normally closed valve to provide a seal between the atmosphere and the fuel tank 12 during times other than refueling of the fuel tank 12.

During refueling, valve control apparatus 32 moves fill valve 34 which moves tank venting valve 44 to an open position in response to introduction of the fuel nozzle into fill passageway 30. The open tank venting valve 44 vents fuel tank 12 to the atmosphere while the fuel nozzle dispenses fuel into tank 12 through filler neck 14. This feature is best shown in FIG. 11.

The pressure/vacuum valve 46 is also normally closed. Pressure/vacuum valve 46 permits fuel vapor from fuel tank 12 to pass to the atmosphere when the pressure inside fuel tank 12 rises above a predetermined level. In addition, pressure/vacuum valve 46 vents atmospheric air into fuel tank 12 if the pressure within fuel tank 12 drops below a predetermined level. The pressure/vacuum valve is best shown in FIGS. 4-6.

Figures 2, 3, 4, 5, 6:
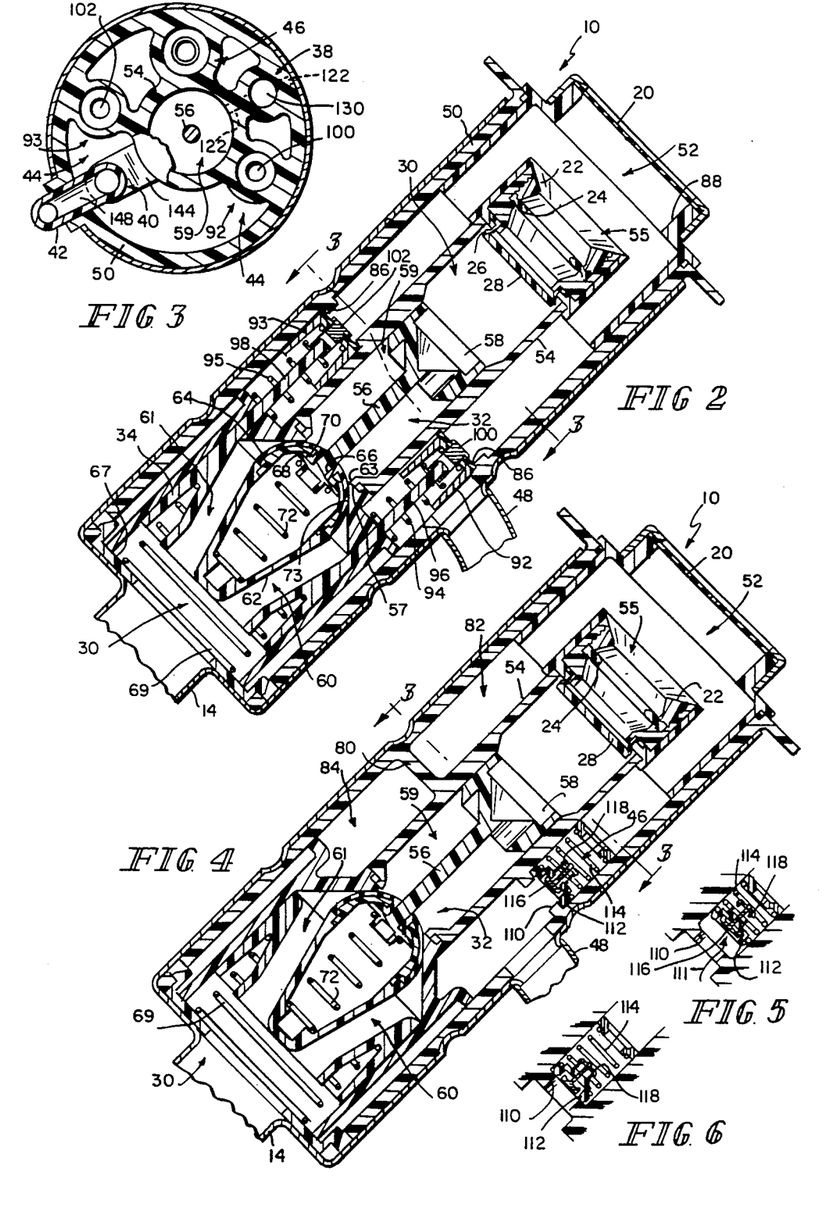
FIG. 2 is a transverse sectional view of the filling control system, illustrating a slide member inside a fill passageway, a fill valve inside the fill passageway in its normally closed position, and two tank venting valves in their normally closed position.
FIG. 3 is a sectional view taken along lines 3—3 of FIGS. 2, 4, and 7 illustrating the relative position of the two venting valves, a pressure/vacuum valve, a contaminant drain valve, a nozzle shutoff valve, and a nozzle shutoff tube surrounding the fill passageway.
FIG. 4 is a view similar to FIG. 2 illustrating the position of the pressure/vacuum valve in its normally closed position.
FIG. 5 is a sectional view of the pressure/vacuum valve shown in FIG. 4 illustrating the pressure valve in its open position to vent fuel vapor from the fuel tank.
FIG. 6 is a sectional view of the pressure/vacuum valve illustrating the vacuum valve in its open position to vent the atmospheric air into the fuel tank.
Figures 7, 8, 9:
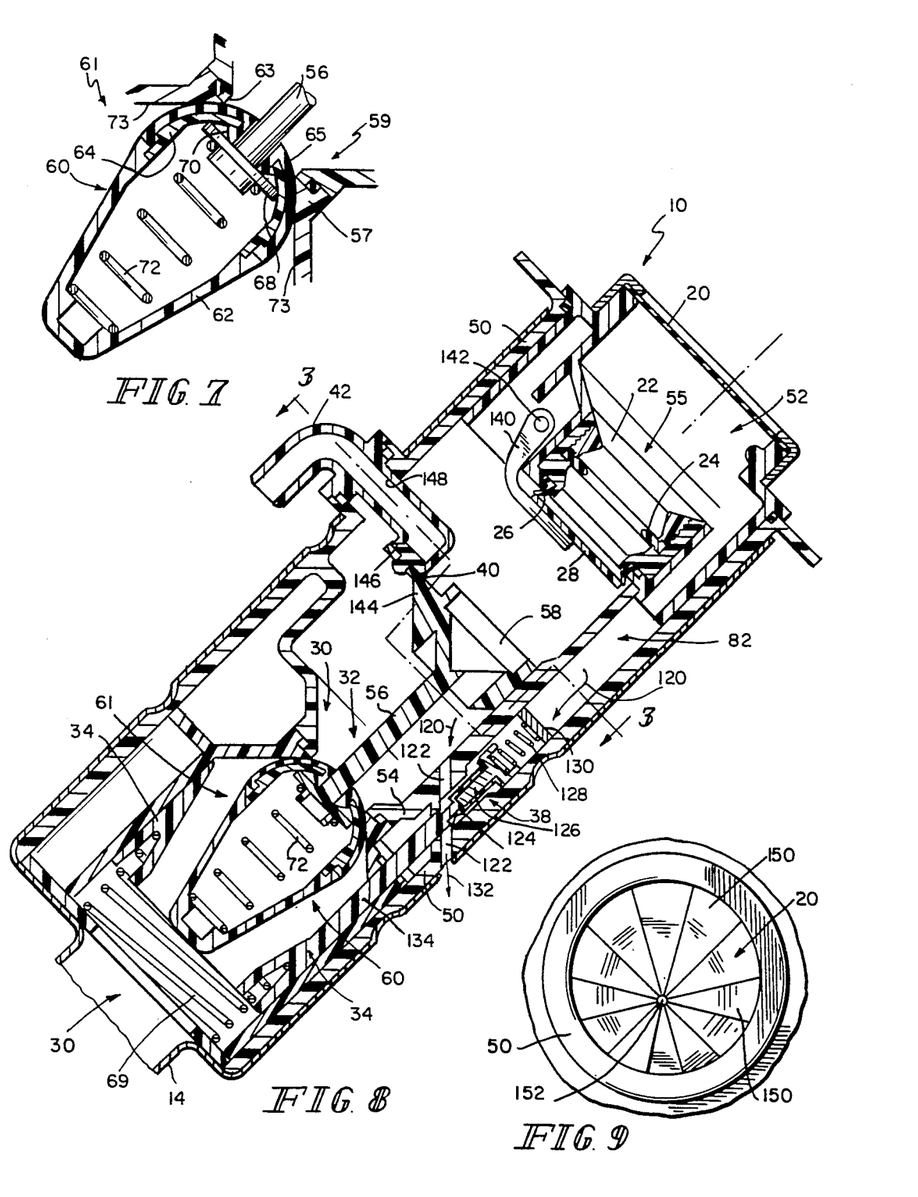
FIG. 7 is an enlarged view illustrating the configuration of a closure member of the fill valve.
FIG. 8 is a transverse sectional view similar to FIGS. 2 and 4 illustrating the nozzle shutoff valve in its normally closed position and illustrating the contaminant drain valve in its normally open position.
FIG. 9 is a plan view of the filling control system illustrating the "appearance" cover on the outer end of the filler neck.

FIGS. 2, 4, and 8 illustrate the filling control system 10 in its "run position" at times other than during refueling of the fuel tank 12. Filling control system 10 includes a vent housing 50 defining an interior region 52 inside vent housing 50. A fuel nozzle housing 54 is located within interior region 52 to define fill passageway 30 within fuel nozzle housing 54. It is understood that fuel nozzle housing 54 and vent housing 50 may be formed integrally as a single unit.

Nozzle actuated valve control apparatus or slide member 32 is situated within fill passageway 30. Slide member 32 includes a shaft portion 56 and a nozzle engaging portion 58 appended to a first end of shaft 56.

A second end of slide member 32 is connected to a closure member 60 of fill valve 34. The closure member 60 provides the valve for opening and closing fill passageway 30. Closure member 60 is best illustrated in FIG. 7.

Fuel nozzle housing 54 includes a partition 57 for dividing fill passageway 30 into an outer chamber 59 communicating with the atmosphere and an inner chamber 61 communicating with the fuel tank filler neck 14. Partition 57 is formed to include an aperture 63 interconnecting outer chamber 59 with inner chamber 61. Closure member 60 is situated in inner chamber 61 of fill passageway 30 and is configured to close the aperture 63 to block flow of fluid from outer chamber 59 to inner chamber 61 upon movement of fill valve 34 to its fill passageway-closing position illustrated in FIGS. 2, 4, and 8. A spring 69 biases fill valve 34 to its normally closed position. Spring 69 engages end wall 67 of vent housing 50 as shown in FIG. 2 to load closure member 60 against a valve seat on partition 57 surrounding aperture 63.

Closure member 60 includes a generally conical base portion 62 and a generally spherical portion 64. Generally spherical portion 64 is formed to include a channel 66 for slidably receiving shaft 56 of slide member 32. A cross member 68 is connected to the second end of shaft 56 inside closure member 60 to retain shaft 56 within closure member 60. A resilient covering material 65 is situated over spherical portion 64 to provide a sealing surface on closure member 60. The covering material 65 extends through channel 66 to provide an annular valve seat 70 around shaft 56 and inside closure member 60. Valve seat 70 engages a cross member 68 connected to shaft 56 of slide member 32 to seal channel 66. A rigid biasing spring 72 is situated inside closure member 60 to bias slide member 32 towards opening 55 providing pump nozzle admitting means into fuel nozzle housing 54. Spring 72 is stronger than spring 69 for reasons explained below in connection with the nozzle overtravel feature shown in FIGS. 11 and 12. Covering material 65 engages valve seat 73 to close fill passageway 30.

A dividing wall 80 is provided between vent housing 50 and fuel nozzle housing 54 to divide the annular region between vent housing 50 and fuel nozzle housing 54 into first and second annular chambers 82 and 84. The dividing wall 80 is formed to include a pair of first apertures 86 for interconnecting the first and second chambers 82 and 84 in fluid communication.

The filling control system includes a first port 88 which provides an opening between the atmosphere and the first annular chamber 82 located in interior region 52 of vent housing 50. A second port opening 90 opens into the second chamber 84. Tank venting tube 48 is connected to second port 90 for communicating fuel vapor from the fuel tank 12 to the second chamber 84 through the second port 90.

First and second venting valves 92 and 93 shown in FIG. 2 are provided for normally closing the first apertures 86 to block flow of fuel vapors from the fuel tank 12 to the atmosphere through the first and second chambers 82 and 84. Vent valves 92 and 93 include bias springs 94 and 95 for biasing vent valves 92 to their normally closed position shown in FIG. 2. Vent valves 92 and 93 are connected to actuator rods 96 and 98, respectively, by suitable fasteners 100 and 102. Actuator rods 96 and 98 are integrally connected to fill valve 34 as shown, for example, in FIG. 2. FIG. 3 illustrates the relative position of vent valves 92 and 93 spaced about fuel nozzle housing 54 inside vent housing 50.

Dividing wall 86 is also formed to include a second aperture 110 for interconnecting first and second chambers 82 and 84. As best shown in FIG. 4, filling control system 10 includes a pressure/vacuum valve 46. Pressure/vacuum valve 46 includes a pressure valve 112 biased to a normally closed position by spring 114. Pressure vacuum valve 46 also includes a vacuum valve 116 biased to a normally closed position by spring 118. As pressure inside fuel tank 12 increases, pressure within second annular chamber 84 also increases because of the fluid connection to fuel tank 12 through tank venting tube 48. If pressure inside second annular chamber 84 increases above a predetermined level, pressure valve 112 moves upwardly to the position shown in FIG. 5. This permits fuel vapor to vent from fuel tank 12 to the atmosphere in the direction of arrow 111 through aperture 110.

If negative pressure above a predetermined level occurs within fuel tank 12, vacuum valve 116 moves to the position shown in FIG. 6 to admit ambient air extant in first chamber 82 into second chamber 84 through the second aperture means 110. This occurs only when the pressure of fuel vapor in the second chamber 84 falls below a predetermined negative pressure. The position of the pressure/vacuum valve 46 relative to vent valves 92 and 93 inside vent housing 50 is best shown in FIG. 3.

When the filling control system 10 is in the run position, it is possible that water or other unwanted contaminants may enter interior region 52 of vent housing 50 through port 88. This will frequently be due to user neglect or tampering with the system 10. In order to remove water or other contaminants from interior region 52 of vent housing 50, a drain contaminant valve 38 is provided, as best shown in FIG. 8. Contaminants entering interior region 52 of vent housing 50 pass in the direction of arrows 120. A drain passageway 122 is formed to extend from fill passageway 30 through fuel housing 54 and through vent housing 50 to the ground underneath the vehicle. As such, the outside end of drain passageway 122 is normally open to the atmosphere.

Contaminants passing in the directions of arrows 120 through either the fill passageway 30 or the first annular chamber 82 pass through drain passageway 122 due to gravity and exit from vent housing 50 in the direction of arrow 132. This prevents contaminants from building up or collecting inside vent housing 50. Contaminant drain valve 38 includes a plunger 126 movable within a chamber 124. Plunger 126 includes a biasing spring 128 attached to a connector wall 130 extending between vent housing 50 and fuel nozzle housing 54. An actuator rod 134 on fill valve 34 engages plunger 126 and moves plunger 126 against the force of spring 128 to a normally open position to permit contaminants to pass through drain passageway 122 while fill valve 34 is in its normally closed position. The position of the contaminant drain valve 38 inside vent housing 50 is best shown in FIG. 3.

FIG. 8 best illustrates closure door 28. Closure door 28 is coupled to a pivot arm 140. Pivot arm 140 is pivotably movable about a pivot shaft 142 to move closure door 28 from its normally closed position against closure door seal 26 to its open position. A spring (not shown) biases pivot arm 140 to maintain closure door 28 in its normally closed position shown in FIG. 8. Upon insertion of fuel nozzle 75 into fill housing 54, closure door pivots to its open position illustrated in FIG. 10.

FIG. 8 further illustrates the configuration of nozzle shutoff valve 40 in its normally closed position. Nozzle shutoff valve 40 is connected to slide member 32 by a support arm 144. When fill valve 34 is in its fill passageway-closing position as shown in FIG. 8, nozzle shutoff valve 40 engages and seals an end 146 of nozzle shutoff tube 42 which extends into interior region 52 of vent housing 50 through an aperture 148 in vent housing 50. The position of nozzle shutoff valve 40 and nozzle shutoff tube 42 inside vent housing 50 is best shown in FIG. 3.

Operation of the filling control system 10 when system 10 is in its "fill position" during refueling is best illustrated in FIGS. 10-12. A fuel nozzle 75 is inserted into filling control system 10 through appearance cover 20. Appearance cover 20 is provided to give the outward appearance that the filler neck is closed to provide comfort to consumers unable to see the internal valve mechanisms provided inside the filler neck and is best shown in FIG. 9. Appearance cover 20 includes a plurality of sections 150 defining an opening 152 in appearance cover 20. Opening 152 is not aligned with the center of vent housing 50. Fuel nozzle 75 then enters interior region 52 of vent housing 50. Nozzle restrictor 22 permits entry of only an unleaded fuel nozzles 75 into fuel housing 54. Nozzle seal 24 engages the outer periphery of fuel nozzle 75 to seal the fuel nozzle 75. Fuel nozzle 75 engages closure door 28 and pivots closure door 28 about pivot shaft 142 to its open position shown in FIG. 10. Fuel nozzle 75 then contacts nozzle engaging member 58 of slide member 32. Fuel nozzle 75 moves the slide member 32 in the direction of arrow 154 to move closure member 60 of fill valve 34 against spring 69 and away from valve seat 73 to its fill passageway-opening position. This permits fuel to pass through aperture 63 formed in partition 57 from the outer chamber 59 to the inner chamber 61 of fill passageway 30. This permits fuel to be discharged from fuel nozzle 75 into filler neck 14.

As shown in FIG. 10, when a fuel nozzle 75 is inserted into fuel housing 54 to engage the slide member 32 and move fill valve 34 to its fill passage way-opening position, actuator rod 134 moves away from plunger 126 of contaminant drain valve 38. Therefore, spring 128 moves plunger 126 in the direction of arrow 136 into engagement with a portion of fuel housing 54 and a portion of vent housing 50 to block drain passageway 122. In this closed position, contaminant drain valve 38 prevents fuel dispensed from fuel nozzle 75 from exiting fill passageway 30 through drain passageway 122. Also, in this closed position, the drain passageway 122 is closed and sealed to permit development of a vacuum around the fuel nozzle during refueling as soon as the fuel level rises high enough in the tank to close the mouth of tube 42 and stop the flow of make-up vapor into the filler neck through the open nozzle shutoff valve.

As shown in FIG. 10, when filling control system 10 is in its fill position, nozzle shutoff valve 40 attached to slide member 32 moves to its open position spaced apart from the end 146 of nozzle shutoff tube 142. A normal fuel nozzle 75 provided at service stations includes an automatic shutoff feature which normally acts to shut off the flow of fuel from the fuel nozzle 75 when the fuel tank 12 is full. This shutoff feature is controlled by aspirator 156 provided in fuel nozzle 75 which shuts off the fuel nozzle 75 when a vacuum is created inside interior region 52 of vent housing 50. As fuel is pumped from fuel nozzle 75 into fuel tank 12, make-up air and vapor inside tank 12 enters interior region 52 of vent housing 50 through nozzle shutoff tube 42. Once the level of fuel inside tank 12 rises above the end of nozzle shutoff tube 42, make-up air no longer enters the interior region 52 and a vacuum is created inside interior region 52 which automatically shuts off fuel nozzle 75.

Also during refueling of fuel tank 12, tank venting valves 92 and 93 are moved to the open position illustrated in FIG. 11 by actuator rods 96 and 98, respectively. As fill valve 34 moves to its fill passageway-opening position, the actuator rods 96 and 98 pull the tank venting valves 92 and 93 away from the first apertures 86. Therefore, the tank venting valves 92 and 93 open the pair of first apertures 86. This permits venting of fuel vapor from inside fuel tank 12 through tank venting tube 48, through second chamber 84, through first apertures 86, through first chambers 82, and through port 88 to the atmosphere during refueling.

FIG. 12 illustrates the filling control system 10 in its run position, when a long fuel nozzle 75 is inserted into fuel nozzle housing 54. Spring 72 situated inside closure member 60 is a rigid spring, stronger than spring 69. Spring 72 normally maintains slide member 32 in the position shown in FIGS. 2, 4, 8, 10, and 11. However, when a long fuel nozzle 75 is inserted into fuel housing 54, the fuel nozzle 75 causes slide member 32 to slide through channel 66 of closure member 60 to move to the position shown in FIG. 12. Therefore, spring 72 permits slide member 32 to move relative to closure member 60 of fill valve 34 when a long fuel nozzle 75 is used. This provides a fuel nozzle 75 overtravel mechanism for the filling control system 10. The overtravel mechanism prevents damage to fill valve 34 when a long fuel nozzle 75 is used to refuel fuel tank 12.

Figures 13, 14, 15:
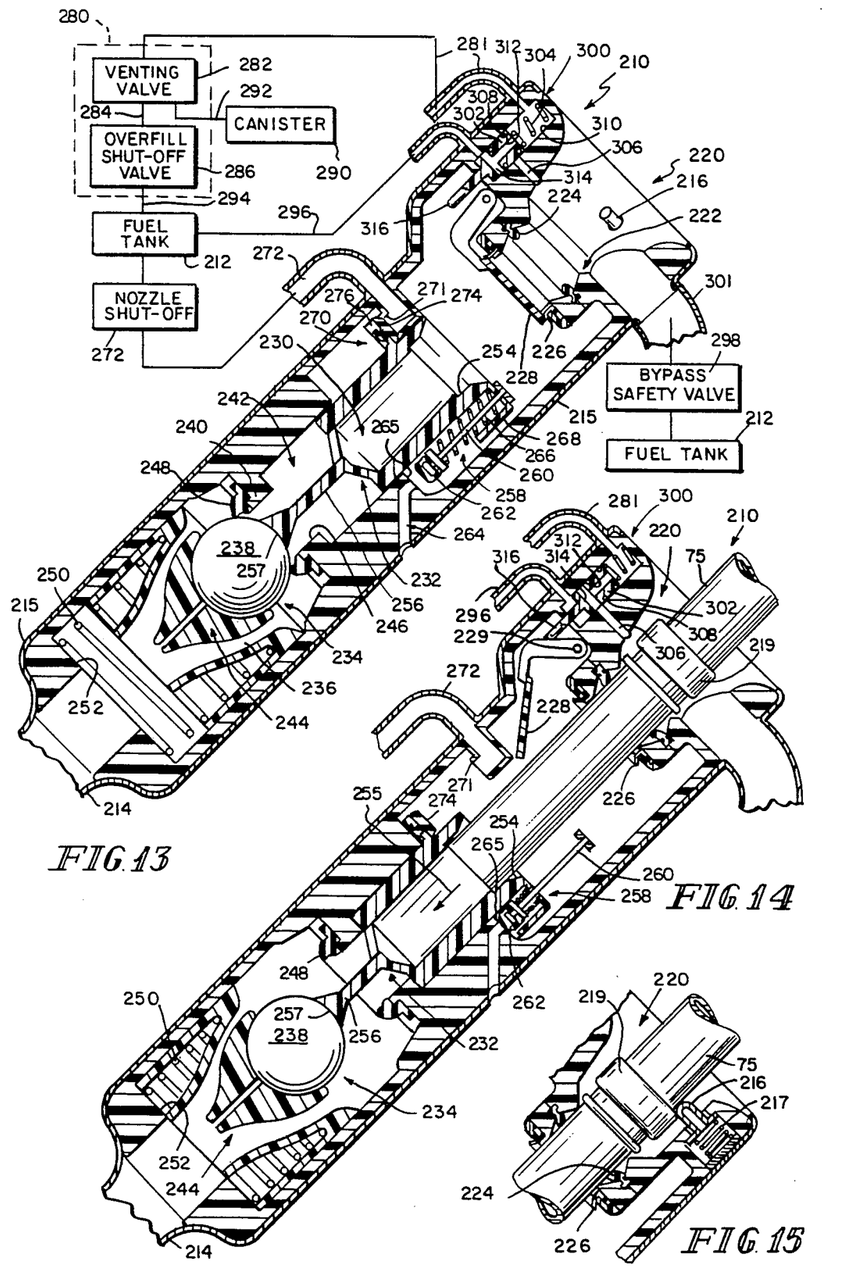
FIG. 13 is a transverse sectional view of a second embodiment of the present invention which includes an onboard fuel vapor recovery system.
FIG. 14 is a view similar to FIG. 13 illustrating operation of the filling control system shown in FIG. 13 during refueling.
FIG. 15 is a sectional view illustrating a retaining member for holding the pump nozzle in a proper position inside the fill passageway.

A second embodiment to the present invention is illustrated in FIGS. 13-15. In this embodiment, the capless refueling system is configured to cooperate with an onboard fuel vapor recovery system shown diagrammatically in FIG. 13 to prevent fuel vapor from escape into the atmosphere during refueling. FIG. 13 illustrates the filling control system 210 in its run position. The filling control system 210 includes a vent housing 215 defining an interior region 220 within vent housing 215. A movable nozzle-retaining member 216 is provided to position fuel nozzle 75 properly inside the filling control system 210. Retaining member 216 is a self-actuated, spring-biased, nozzle latch to hold the nozzle 75 in the proper orientation for hands-off refueling.

Interior region 220 provides a fill passageway 230 inside vent housing 215. A slide member 232 is situated inside fill passageway 230. A fill valve 234 is also situated inside fill passageway 230. Fill valve 234 is a normally closed valve which blocks flow of fluid through fill passageway 230 when filling control system 210 is in its run position shown in FIG. 13. Fuel valve 234 includes a body portion 236 and a ball portion 238. Vent housing 215 includes a partition 240 for dividing fill passageway 230 into an outer chamber 242 communicating with the atmosphere and an inner chamber 244 communicating with filler neck 214 of fuel tank 212. Partition 240 is formed to include an aperture 246 to provide fluid communication between the outer chamber 242 and the inner chamber 244. A valve seat 248 is coupled to partition 240 to provide a seal when fill valve 234 is in its fill passageway-closing position as shown in FIG. 13. Valve seat 248 abuts ball 238 of fill valve 234 to seal the fill passageway 230. Fill valve 234 is biased to its normally closed position by spring 250. An end of spring 250 abuts an end wall 252 of vent housing 215.

A normally open contaminant drain valve 258 is also provided to remove contaminants which enter into interior region 220 when the filling control system 210 is in its run position. Contaminant drain valve 258 includes an actuator rod 260 and a sealing member or pad 262 coupled to a first end of the actuator rod 260. Contaminant drain valve 258 includes a drain passageway 264 extending through vent housing 215 to provide fluid communication between interior region 220 of vent housing 215 and the atmosphere when filling control system 210 is in its run position shown in FIG. 13. A second end of actuator rod 260 is coupled to a support arm 268 of slide member 232. A spring 266 biases the actuator arm to its extended position shown in FIG. 13.

The filling control system 210 also includes a nozzle shut-off valve 270. Nozzle shut-off valve 270 seals an end 271 of nozzle shut-off tube 272 located inside interior region 220 when filling control system 210 is in its run position. Nozzle shut-off valve 270 includes a sealing member 274 coupled to a support arm 276 of slide member 232.

FIG. 14 illustrates the filling control system 210 in its fill position. A nozzle 75 is inserted through nozzle restrictor 222, nozzle seal 224, and closure door seal 226. Nozzle 75 moves closure door 228 to its open position shown in FIG. 14 by pivoting the closure door 228 about pivot shaft 229. Fuel nozzle 75 then engages engaging member 254 of slide member 232 and moves the slide member in the direction of arrow 255. Shaft 256 of slide member 232 includes an end portion 257 which abuts ball 238 of fill valve 234. As slide member 232 moves in the direction of arrow 255, slide member 232 forces ball 238 fill valve 234 away from valve seat 248 against the force of spring 250 to open fill valve 234. Fuel is then permitted to be discharged from fuel nozzle 75 through outer chamber 242 and inner chamber 244 into filler neck 214.

When filling control system 210 is in the position shown in FIG. 14, containment drain valve 258 moves to its closed position. Sealing pad 262 engages a wall 265 to cover and seal drain passageway 264. This blocks passage of fuel through drain passageway 264 during refueling.

During refueling, slide member 232 also opens nozzle shut-off valve 270. As shown in FIG. 14, seal 274 moves with slide member 232 away from opening 271 of nozzle shut-off tube 272. This provides an automatic shut-off feature as discussed above with reference to the first preferred embodiment.

As shown in FIG. 15, nozzle-retaining member 216 is provided to hold nozzle 75 in a proper position within interior region 220. Nozzle-retaining member 216 is biased toward the nozzle 75 by a spring 217 and engages, for example, a collar 219 provided on nozzle 75 to hold nozzle 75 in a proper position during refueling.

Filling control system 210 also includes a vapor recovery system 280. Vapor recovery system 280 includes a venting valve 282 and an overfill shut-off valve 286 connected to venting valve 282 by vapor flow passage 284. Reference is hereby made to U.S. Pat. No. 4,816,045 to Harris et al. for a complete description of a suitable onboard fuel vapor recovery system including a venting valve, overfill shut-off valve, and canister.

Overfill shut-off valve hose 294 connects overfill shut-off valve 286 to fuel tank 212. Venting valve 282 is at least partially controlled by an actuation conduit 281 coupled to vent housing 215. Vapor recovery system 280 acts to control the flow of fuel vapor from fuel tank 212 to a conventional canister 290 through a fuel vapor discharge hose 292. It will be understood that the canister 290 acts as a fuel vapor treatment site for treating and controlling fuel vapor routed thereto. Preferably, the canister 290 is a conventional charcoal canister or other vapor condenser which adsorbs liquid fuel entrained in the recovered fuel vapor on a substrate to permit recombustion within the vehicle engine (not shown). Details of the operation of vapor recovery system 280 are discussed in U.S. Pat. No. 4,816,045 which is assigned to the assignee of the present invention.

A valve assembly 300 for controlling the flow of air from the atmosphere to actuation conduit 281 and the flow of fuel vapor from tank tube 296 to actuation conduit 281 is shown in FIGS. 13 and 14 to control operation of the onboard fuel vapor recovery system automatically. Valve assembly 300 is shown to include a valve 302 and bias means 304 for yieldably moving valve 302 between a "run" position shown in FIG. 13 and a "refueling" position as shown in FIG. 14. A transfer tube 306 is provided for communicating ambient air to the valve 302 as shown in FIGS. 13 and 14. Also, a pair of sealing rings 308 are provided for establishing a seal between valve 302 and the wall defining the channel 310 in which valve 302 is free to reciprocate.

Valve 302 is formed to include several interior passageways situated to interconnect selected pairs of tubes 281, 296, and 306 as a function of the position of valve 302 in channel 310 to control the operation of the tank venting system via module 280. The valve 302 is formed to include an axial passageway 312 and a transverse passageway 314 interconnecting axial passageway 312 at a junction inside valve 302.

As shown in FIG. 13, passageways 312 and 314 normally cooperate to interconnect tubes 281 and 296 in fluid communication so that fuel vapor is conducted from fuel tank 212 to venting valve 282 so that venting valve 282 will be exposed to tank pressure on both sides. In such a condition, venting valve 282 will remain closed to block flow of fuel vapor from the fuel tank 212 to the canister 290 as explained in greater detail in U.S. Pat. No. 4,816,045.

As soon as fuel nozzle 75 is inserted into the filler neck module 210 during refueling, it pivots the closure door 228 to engage and move an actuator rod 316 connected to valve 302. This causes the door 228 to exert a force on rod 316 moving valve 302 to its refueling position shown in FIG. 14. In this position, passageways 312 and 314 cooperate to break the connection between tubes 296 and 281 and establish a new connection between tubes 306 and 281. Now, ambient air is conducted through the passageways 312, 314 to venting valve 282 through tube 281 instead of fuel vapor as shown in FIG. 13. At this point, the venting valve 282 is exposed to a pressure imbalance because it sees tank pressure in tube 284 and atmospheric pressure in tube 281 causing the venting valve 282 to move to a venting or open position permitting fuel vapor to be conducted past venting valve 282 from fuel tank 212 to canister 290.

The filling control system 210 also includes a safety bypass valve 298. Upon failure of the fuel nozzle 75 to shut-off, bypass valve 298 is activated to divert fuel through hose 300 so that the fuel swirls in the upper portion of the interior region 220 of vent housing 215 to alert the user to shut the fuel nozzle 75 off.

Although the invention has been described in detail with reference to preferred embodiments, variations and modifications exist within the scope and spirit of the invention as described and defined in the following claims.

What is claimed is:

1. An assembly for controlling filling of a vehicle fuel tank having a filler neck, the assembly comprising means for conducting liquid fuel through a fill passageway to the filler neck for delivery to the fuel tank, the conducting means being formed to include means for admitting a fuel-dispensing nozzle therein to introduce liquid fuel into the conducting means and valve means for normally closing the fill passageway, the valve means being movable between a fill passageway-opening position and a fill passageway-closing position, the conducting means including partition means for dividing the fill passageway into an outer chamber communicable with the atmosphere and an inner chamber in fluid communication with the filler neck, the partition means being formed to include an aperture interconnecting the outer and inner chambers in fluid communication, the valve means including a closure member situated in the inner chamber and configured to close the aperture to block flow of fluid from the outer chamber into the inner chamber upon movement of the valve means to its fill passageway-closing position and first spring means for yieldably biasing the closure member normally into engagement with the partition means to close the aperture interconnecting the inner and outer chambers, and valve control means for moving the valve means from its fill passageway-closing position to the fill passageway-opening position in response to movement of a fuel-dispensing nozzle into the fill passageway, the valve control means being situated in the fill passageway to engage a fuel-dispensing nozzle inserted therein and connected to the valve means, the valve control means including means for engaging a fuel-dispensing nozzle inserted into the outer chamber, means for moving the closure member against a biasing force provided by the first spring means to move the closure member from its normal position closing the aperture to a retracted position opening the aperture in response to movement of the fuel-dispensing nozzle in the outer chamber against the engaging means, a slide member movable in the fill passageway, and second spring means for yieldably urging the slide member toward the admitting means, the second spring means interconnecting the slide member an the valve means to move the closure member away from the aperture during movement of the valve means to its fill passageway-opening position, the second spring means being compressible between the slide member and the valve means to permit movement of the slide member relative to the valve means.

2. The assembly of claim 1 wherein the closure member is formed to include an interior region and a channel having an outside opening communicating with the outer chamber of the fill passageway and an inside opening communicating with the interior region, the closure member includes a valve seat in the interior region around the inside opening, the slide member includes a shaft slidably received in the channel, the shaft has a first end disposed in the outer chamber and configured to engage a fuel-dispensing nozzle inserted therein and a second end disposed in the interior region of the closure member and configured to engage the valve seat and close the inside opening into the channel, and the second spring means is disposed in the interior region and positioned to urge the second end of the shaft against the valve seat to block fluid flow through the channel.

3. An assembly for controlling filling of a vehicle fuel tank having a filler neck, the assembly comprising means for conducting liquid fuel through a fill passageway to the filler neck for delivery to the fuel tank, the conducting means being formed to include means for admitting a fuel-dispensing nozzle therein to introduce liquid fuel into the conducting means and valve means for normally closing the fill passageway, the valve means being movable between a fill passageway-opening position and a fill passageway-closing position, the conducting means including partition means for dividing the fill passageway into an outer chamber communicable with the atmosphere and an inner chamber in fluid communication with the filler neck, the partition means formed to include an aperture interconnecting the outer and inner chambers in fluid communication, the valve means including a closure member situated in the inner chamber and configured to close the aperture to block flow of fluid from the outer chamber into the inner chamber upon movement of the valve means to its fill passageway-closing position, and valve control means for moving the valve means from its fill passageway-closing position to the fill passageway-opening position in response to movement of a fuel-dispensing nozzle into the fill passageway, the valve control means being situated in the fill passageway to engage a fuel-dispensing nozzle inserted therein and connected to the valve means, the valve control means including means for moving the closure member away from the partition means to open the aperture in response to insertion of a fuel-dispensing nozzle in the fill passageway so that fuel discharged from the fuel-dispensing nozzle passes from the outer chamber through the aperture into the inner chamber to reach the filler neck, the moving means being movable relative to the closure means.

4. The assembly of claim 3, wherein the moving means includes a slide member formed to include means for receiving a distal tip of a fuel-dispensing nozzle and means on the slide member for slidably engaging the conducting means to support the slide member for reciprocable movement in the fill passageway.

5. The assembly of claim 4, wherein the valve means further includes means on the closure member for slidably engaging the conducting means to support the closure member for reciprocable movement in the fill passageway, and the slide member further includes means for engaging the closure member during movement of the slide member away from the admitting means to urge the closure member away from the partition means to open the aperture.

6. An assembly for controlling filling of a vehicle fuel tank having a filler neck, the assembly comprising means for conducting liquid fuel through a fill passageway to the filler neck for delivery to the fuel tank, the conducting means being formed to include means for admitting a fuel-dispensing nozzle therein to introduce liquid fuel into the conducting means and valve means for normally closing the fill passageway, the valve means being movable between a fill passageway-opening position and a fill passageway-closing position, valve control means for moving the valve means from its fill passageway-closing position to the fill passageway-opening position in response to movement of a fuel-dispensing nozzle into the fill passageway, the valve control means being situated in the fill passageway to engage a fuel-dispensing nozzle inserted therein and connected to the valve means, a vent housing having an interior region, means for dividing the interior region into first and second chambers, the dividing means being formed to include first aperture means for interconnecting the first and second chambers in fluid communication, the vent housing being formed to include a first port opening into the first chamber and open to the atmosphere and a second port opening into the second chamber, means for communicating fuel vapor from the fuel tank to the second chamber through the second port, and venting valve means for normally closing the first aperture means to block flow of fuel vapors from the fuel tank to the atmosphere through the first and second chambers in the vent housing, the venting valve means being movable between a first aperture means-opening and a first aperture means-closing position, the valve means further including actuator means for moving the venting valve means from its first aperture means-closing position to a first aperture means-opening position in response to actuation of the valve control means to move the valve means to its fill passageway-opening position.

7. The assembly of claim 6, wherein the conducting means is situated to extend into the interior region of the vent housing to position the admitting means in the first chamber.

8. The assembly of claim 6, wherein the dividing means is formed to include second aperture means for interconnecting the first and second chambers in fluid communication, and further comprising pressure-relief means for venting fuel vapor in the second chamber to the first chamber through the second aperture means only when the pressure of fuel vapor in the second chamber exceeds a predetermined positive pressure.

9. The assembly of claim 6, wherein the dividing means is formed to include second aperture means for interconnecting the first and second chambers in fluid communication, and further comprising vacuum relief means for admitting ambient air extant in the first chamber into the second chamber through the second aperture means only when the pressure of fuel vapor in the second chamber exceeds a predetermined negative pressure.

10. An assembly for controlling filling of a vehicle fuel tank having a filler neck, the assembly comprising means for conducting liquid fuel through a fill passageway to the filler neck for delivery to the fuel tank, the conducting means being formed to include means for admitting a fuel-dispensing nozzle therein to introduce liquid fuel into the conducting means and valve means for normally closing the fill passageway, the valve means being movable between a fill passageway-opening position and a fill passageway-closing position, the conducting means including partition means for dividing the fill passageway into an outer chamber communicable with the atmosphere and an inner chamber in fluid communication with the filler neck, the partition means being formed to include an aperture interconnecting the outer and inner chambers in fluid communication, the valve means including a closure member situated in the inner chamber and configured to close the aperture to block flow of fluid from the outer chamber into the inner chamber upon movement of the valve means to its fill passageway-closing position, valve control means for moving the valve means from its fill passageway-closing position to the fill passageway-opening position in response to movement of a fuel-dispensing nozzle into the fill passageway, the valve control means being situated in the fill passageway to engage a fuel-dispensing nozzle inserted therein and connected to the valve means, and means for draining liquid collecting in the outer chamber through a drain passageway so that unwanted liquid is not extant in the outer chamber during movement of the valve means to its fill passageway-opening position.

11. The assembly of claim 10, further comprising means for closing the drain passageway in response to movement of the valve means to its fill passageway-opening position so that ambient air is unable to enter the outer chamber through the drain passageway during refueling.

12. An assembly for controlling filling of a vehicle fuel tank having a filler neck, the assembly comprising means for conducting liquid fuel through a fill passageway to the filler neck for delivery to the fuel tank, the conducting means including chamber means for receiving a fuel-dispensing nozzle during refueling, the chamber means being formed to include first inlet means for sealingly receiving a dispensing end of the nozzle, second inlet means for receiving a supply of make-up vapor, and outlet means for communicating liquid fuel to the fuel tank, means communicating with the second inlet means for supplying make-up vapor from the fuel tank to the chamber means during refueling, first closure means for normally closing the outlet means to block the flow of liquid fuel from the fill passageway into the filler neck, the closing means being movable relative to the conducting means between an outlet means-opening position and an outlet means-closing position, and second closure means coupled to the first closure means for closing the second inlet means upon movement of the first closure means to its outlet means-closing position to block flow of fluid from the chamber means to the fuel tank through the supplying means while the first closure means is in its outlet means-closing position.

13. The assembly of claim 12, wherein the supplying means includes a fuel-conducting tube having one end positioned at a predetermined location within the fuel tank and the other end coupled to the second inlet means so that introduction of liquid fuel into the one end effectively shuts off the supply of make-up vapor from the fuel tank to the chamber means, and the fuel-conducting tube extends into the chamber means to position its other end in the interior region of the chamber means, and the second closure means includes a valve member configured to engage and close said other end of the fuel-conducting tube.

14. The assembly of claim 13, further comprising control means for moving the first closure means from its outlet means-closing position to its outlet means-opening position in response to movement of a fuel-dispensing nozzle into the chamber means, the control means being situated in the chamber means to engage a fuel-dispensing nozzle inserted therein and connected to the first closure means, the second closure means further including means coupled to the control means for supporting the valve member for movement therewith so that the valve member is moved to engage and close said other end of the fuel-conducting tube upon movement of the first closure means to its outlet means-closing position and is moved away from the fuel-conducting tube to open said other end upon movement of the first closure means to its outlet means-opening position.

15. The assembly of claim 12, further comprising means for draining any liquid extant in the chamber means from the chamber means upon movement of the first closure means to its outlet means-closing position so that unwanted liquid is unable to collect in the chamber means and drain through the outlet means into the fuel tank upon movement of the first closure means to its outlet means-opening position.

16. The assembly of claim 15, wherein the draining means includes a drain passageway formed in the conducting means to empty unwanted liquid from the chamber means and valve means for selectively closing the drain passageway to block flow of air therethrough in response to movement of the first closure means to its outlet means-opening position.

17. The assembly of claim 16, wherein the vale means includes a valve member, means for supporting the valve member for movement between a drain passageway-opening position and a drain passageway-closing position, spring means for yieldably biasing the valve member to its drain passageway-closing position, and means coupled to the first closure means for moving the valve member against the spring means to its drain passageway-opening position in response to movement of the first closure means to its outlet means-closing position.

18. The assembly of claim 12, wherein the conducting means is formed to include second outlet means for draining liquid extant in the chamber means from the chamber means, and the first closure means includes a first valve member and first spring means for yieldably urging the first valve member into engagement with the chamber means to close the outlet means, and further comprising a second valve member, means for supporting the second valve member for movement between a second outlet means-opening position and a second outlet means-closing position, and second spring means for yieldably biasing the second valve member to its second outlet means-closing position, the first closure means further including an actuator rod positioned to contact the second valve member during movement of the first closure means toward its outlet means-closing position, the first spring means being positioned to exert a predetermined force on the actuator rod in excess of another predetermined force exerted by the second spring means on the second valve member to cause the second valve member to move to its second outlet means-opening position in response to movement of the first closure means to its outlet means-closing position.

19. A filler for neck for use in delivering fuel to a vehicle fuel tank, the filler neck including a conduit formed to include an open mouth at an outer end of the conduit and a fill passageway extending through the conduit and communicating with the open mouth, means for closing the fill passageway to block discharge of fuel tank vapors to the atmosphere through the open mouth, the closing means being situated in the fill passageway in spaced-apart relation to the open mouth, partition means for dividing the fill passageway into an outer chamber communicable with the atmosphere through the open mouth and an inner chamber, the partition means including aperture means for sealingly admitting a fuel-dispensing nozzle into the inner chamber without coupling the inner and outer chambers in fluid communication during refueling, the closing means being positioned in the inner chamber in spaced-apart relation to the aperture means, and a fuel splash door pivotably mounted in the space defined in the inner chamber between the aperture means and the closing means to cover the aperture means yet move relative to the partition means to an aperture means-opening position when engaged by a fuel-dispensing nozzle inserted into the inner chamber through the aperture means.

20. The filler of claim 19, wherein the closing means is movable between a fill passageway-opening position and a fill passageway-closing position, and further comprising a slide member supported in the fill passageway for reciprocable movement therein, the slide member including an outer end positioned to engage a fuel-dispensing nozzle inserted into the fill passageway and an inner end coupled to the closing means to move the closing means to its fill passageway-opening position in response to movement of the slide member in the filler passageway away from the open mouth of the conduit.

21. An assembly for controlling filling of vehicle fuel tank having a filler neck, the assembly comprising means for selectively venting the fuel tank to permit flow of fuel vapors from the fuel tank to the atmosphere, the venting means including outlet means for conducting fuel vapor from the fuel tank to the atmosphere and venting valve means for normally closing the outlet means to block flow of fuel vapors from the fuel tank to the atmosphere through the outlet means, inlet means for conducting liquid fuel through a fill passageway to the filler neck for delivery to the filler tank, the inlet means being formed to include means for admitting a fuel-dispensing nozzle therein to introduce liquid fuel into the filler neck and fill valve means for normally closing the fill passageway, the fill valve means being movable between a fill passageway-opening position and a fill passageway-closing position, and valve control means for moving the fill valve means from its fill passageway-closing position to the fill passageway-opening position in response to movement of a fuel-dispensing nozzle into the fill passageway, the fill valve means including means for actuating the venting valve means to open the outlet means in response to movement of the fill valve means to the fill passageway-opening position so that fuel vapors flow from the fuel tank to the atmosphere to vent the fuel tank while the fill valve occupies a fill passageway-opening position.

22. The assembly of claim 21, wherein the outlet means includes a vent housing and a tank venting tube connecting the fuel tank and the vent housing, and the inlet means is coupled to the filler neck and arranged to extend into the vent housing.

23. The assembly of claim 22, wherein the vent housing has an interior region, means for dividing the interior region into first and second chambers, a first port opening into the first chamber and open to the atmosphere, and a second port opening into the second chamber and receiving fuel vapor from the tank venting tube, the dividing means is formed to include first aperture means for interconnecting the first and second chambers in fluid communication, the venting valve means is arranged normally to close the first aperture means, and the inlet means extends from the first chamber into the second chamber through an aperture formed in the dividing means.

24. The assembly of claim 23, wherein the inlet means is situated to position the admitting means in the first chamber.

25. The assembly of claim 21, wherein the vent housing has an interior region, means for dividing the interior region into first and second chambers, a first port opening into the first chamber and open to the atmosphere, and a second port opening into the second chamber and receiving fuel vapor from the tank venting tube, the dividing means is formed to include first aperture means for interconnecting the first and second chambers in fluid communication, and the venting valve means is arranged normally to close the first aperture means.

26. The assembly of claim 25, wherein the dividing means is formed to include second aperture means for interconnecting the first and second chambers in fluid communication, and further comprising pressure-relief means for venting fuel vapor in the second chamber to the first chamber through the second aperture means only when the pressure of fuel vapor in the second chamber exceeds a predetermined positive pressure.

27. The assembly of claim 25, wherein the dividing means is formed to include second aperture means for interconnecting the first and second chambers in fluid communication, and further comprising vacuum-relief means for admitting ambient air extant in the first chamber into the second chamber through the second aperture means only when the pressure of fuel vapor in the second chamber exceeds a predetermined negative pressure.

28. The assembly of claim 21, wherein the inlet means includes partition means for dividing the fill passageway into an outer chamber communicable with the atmosphere and an inner chamber in fluid communication with the filler neck, the partition means is formed to include an aperture interconnecting the outer and inner chambers in fluid communication, the fill valve means includes a closure member situated in the inner chamber and configured to close the aperture to block flow of fluid from the outer chamber into the inner chamber upon movement of the fill valve means to its fill passageway-closing position and an actuator member coupled to the venting valve means and arranged in spaced relation to the closure member to provide a fluid flow passageway therebetween through the inner chamber.

29. The assembly of claim 28, wherein the venting valve means includes a valve member appended to the actuator member and spring means acting between the partition means and the valve member for yieldably biasing the valve member to an outlet means-closing position.

30. An assembly for controlling filling of a vehicle fuel tank having a filler neck, the assembly comprising means for conducting liquid fuel through a fill passageway to the filler neck for delivery to the fuel tank, the conducting means including partition means for dividing the fill passageway into an outer chamber communicable with the atmosphere and an inner chamber in fluid communication with the filler neck, the partition means being formed to include an aperture interconnecting the outer and inner chambers in fluid communication, fill valve means for normally closing the aperture to block flow of fluid from the outer chamber into the inner chamber, and means for draining liquid collecting in the outer chamber through a drain passageway to a point outside of the fill passageway so that unwanted liquid is not extant in the outer chamber when the aperture in the partition means is opened.

31. The assembly of claim 30, further comprising valve control means for moving the fill valve means to open the aperture formed in the partition means in response to movement of a fuel-dispensing nozzle in the fill passageway.

32. The assembly of claim 31, wherein the valve control means is situated in the fill passageway to engage a fuel-dispensing nozzle inserted therein and connected to the fill valve means.

33. The assembly of claim 30, further comprising means for closing the drain passageway in response to movement of the fill valve means to open the aperture so that ambient air is unable to enter the outer chamber through the drain passageway during refueling.

34. The assembly of claim 30, further comprising means for normally closing the drain passageway.

35. The assembly of claim 34, wherein the closing means includes a linkage comprising a valve member and means for yieldably biasing the valve member normally to close the aperture.

36. The assembly of claim 35, wherein the biasing means is situated outside of the drainage passageway.

* * * * *